(12) United States Patent
Odaka et al.

(10) Patent No.: US 7,785,713 B2
(45) Date of Patent: Aug. 31, 2010

(54) ACTIVE ENERGY RAY-CURABLE COATING COMPOSITION AND MOLDED ARTICLE HAVING CURED COATING FILM OF THE COMPOSITION

(75) Inventors: Kazuyoshi Odaka, Aichi (JP); Koji Furukawa, Aichi (JP); Hiroyuki Satou, Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 127 days.

(21) Appl. No.: 12/298,581

(22) PCT Filed: Apr. 9, 2007

(86) PCT No.: PCT/JP2007/057829
§ 371 (c)(1),
(2), (4) Date: Oct. 27, 2008

(87) PCT Pub. No.: WO2007/125746
PCT Pub. Date: Nov. 8, 2007

(65) Prior Publication Data
US 2009/0111904 A1  Apr. 30, 2009

(30) Foreign Application Priority Data
Apr. 25, 2006 (JP) .............................. 2006-120519
Apr. 27, 2006 (JP) .............................. 2006-123650

(51) Int. Cl.
*C09D 4/00* (2006.01)
*C09D 175/04* (2006.01)
*C08J 7/16* (2006.01)
*B32B 27/40* (2006.01)
*F21S 8/10* (2006.01)

(52) U.S. Cl. ...................... 428/412; 428/423.1; 522/96; 522/167; 522/173

(58) Field of Classification Search .................. 428/412; 522/96, 167, 173, 174, 182, 183; 264/494
See application file for complete search history.

(56) References Cited

U.S. PATENT DOCUMENTS

| 4,541,881 | A | * | 9/1985 | Sebastiano | ................... | 156/99 |
| 4,632,975 | A | * | 12/1986 | Cornell et al. | ............... | 528/354 |
| 5,322,861 | A | * | 6/1994 | Tsuge et al. | ................... | 522/90 |
| 2005/0148739 | A1 | | 7/2005 | Hara et al. | | |

FOREIGN PATENT DOCUMENTS

| JP | 56 122840 | 9/1981 |
| JP | 4 130119 | 5/1992 |
| JP | 4 311714 | 11/1992 |
| JP | 5 230397 | 9/1993 |
| JP | 6 128502 | 5/1994 |
| JP | 8 283607 | 10/1996 |
| JP | 8 283608 | 10/1996 |
| JP | 9 286809 | 11/1997 |
| JP | 2000 63701 | 2/2000 |
| JP | 2002 121307 | 4/2002 |
| JP | 2002 249680 | 9/2002 |
| JP | 2003 119231 | 4/2003 |
| JP | 2004 124108 | 4/2004 |
| JP | 2004 217879 | 8/2004 |
| JP | 2004 244426 | 9/2004 |
| JP | 2005 281412 | 10/2005 |

* cited by examiner

*Primary Examiner*—Susan W Berman
(74) *Attorney, Agent, or Firm*—Oblon, Spivak, McClelland, Maier & Neustadt, L.L.P.

(57) ABSTRACT

Disclosed is an active energy ray-curable coating composition containing (A) 10 to 70% by mass of a poly(meth)acrylate of a mono- or polypentaerythritol; (B) 5 to 50% by mass of (B-1) a polyester type aliphatic urethanedi(meth)acrylate compound which is obtained by reacting an aliphatic isocyanate compound, a caprolactone-modified polyester diol, and an acrylate having a hydroxyl group, (B-2) a compound represented by formula (2), or (B-3) a polyether type urethane di(meth)acrylate compound having two (meth)acryloyloxy groups in a molecule, wherein, in the case that component (B) is component (B-3), component (A) contains at least one caprolactone-modified (meth)acryloyloxy group; (C) 5 to 70% by mass of a poly[(meth)acryloyloxyalkyl](iso)cyanurate represented by formula (3) or (4); and (D) 0.1 to 10% by mass of a photopolymerization initiator. The active energy ray-curable coating composition can form a cured film excellent in weatherability, mar resistance, and adhesion to a base material.

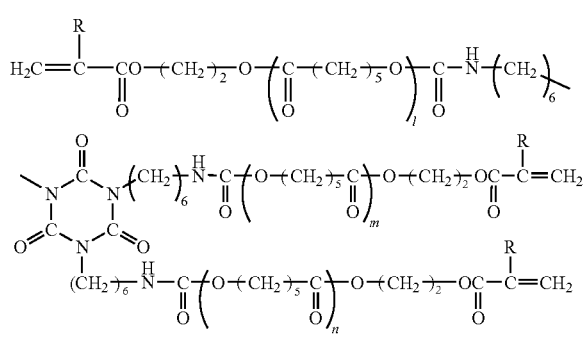

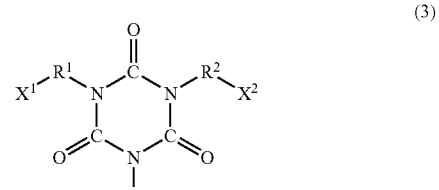

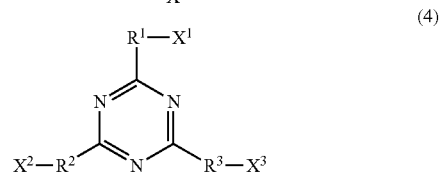

10 Claims, No Drawings

ACTIVE ENERGY RAY-CURABLE COATING COMPOSITION AND MOLDED ARTICLE HAVING CURED COATING FILM OF THE COMPOSITION

TECHNICAL FIELD

The present invention is related to a coating composition that enables to form a cured coating film, on a surface of a base material by irradiation of an active energy ray, which is excellent, in particular, in mar resistance and weatherability and in surface smoothness, heat resistance, chemical resistance, durability, and adhesion to the base material.

BACKGROUND ART

Synthetic resin molded articles made from polymethyl methacrylate resins, polymethacrylimide resins, polycarbonate resins, polystyrene resins, AS resins, and the like are not only lightweight and excellent in impact resistance but also excellent in transparency and are being frequently used in various lamp lenses, glazing materials, covers for gauges, and the like as automotive plastic materials in recent years. In particular, as for headlamp lenses, use of the plastic materials is increasing owing to a tendency to lightweight automobiles for improving the fuel cost and diversification of design. On the other hand, these synthetic resin molded articles are susceptible to damages on their surfaces by contacting, wearing, scratching, or the like with other hard substances because mar resistance of their surfaces is insufficient, and damages generated on their surfaces lower their merchandise value. Further, in the case that these synthetic resin molded articles are used as the aforementioned automotive materials, weatherability is also an important performance. In particular, in the case of a polycarbonate resin and the like, weatherability thereof is insufficient and they are easily deteriorated by an active energy ray such as ultraviolet ray included in sunlight, and molded articles thereof are considerably yellowed or cracks are generated on the surfaces of the molded articles.

Various methods for improving such shortcomings of the synthetic resin molded articles have been conventionally investigated, and for example, a method in which a coating material composed of a silicone based or melamine based resin composition is coated on a surface of a synthetic resin molded article and subjected to heating condensation to form a crosslinked coating film, and hence mar resistance is improved and a method in which a resin composition composed of a radical polymerizable monomer is coated on a surface of a synthetic resin molded article and an active energy ray is irradiated on the resultant surface to form a crosslinked coating film have been proposed (Patent Document 1: Japanese Patent Application Laid-Open No. Sho 56-122,840).

Among these methods, a resin composition obtained by compounding substances such as a poly(meth)acrylate of a mono- or poly-pentaerythritol, a urethane poly(meth)acrylate compound having at least 2 radical-polymerizable unsaturated double bonds in a molecule, and a poly[(meth)acryloyloxyalkyl](iso)cyanurate in a specific proportion is proposed, and it is found that this resin composition can realize a compatibility of excellent mar resistance and weatherability (Patent Document 2: Japanese Patent Application Laid-Open No. Hei 05-230,397, Patent Document 3: Japanese Patent Application Laid-Open No. Hei 06-128,502).

However, further improvement in weatherability is desired for the purpose of use in a long period of time under a severe environment such as high humidity environment. While, a resin composition which is excellent in weatherability and contains a polyester type aliphatic urethanepoly(meth)acrylate compound composed of an aliphatic isocyanate compound having two isocyanate groups in a molecule, a caprolactone-modified polyester diol, and an acrylate having a hydroxyl group is proposed (Patent Document 4: Japanese Patent Application Laid-Open No. Hei 08-283,607, Patent Document 5: Japanese Patent Application Laid-Open No. Hei 08-283,608, Patent Document 6: Japanese Patent Application Laid-Open No. 2004-217,879)

However, the compositions described in these patent documents are not sufficient in mar resistance.

While, a resin composition containing a caprolactone-modified poly(meth)acrylate of a mono- or polypentaerythritol is proposed (Patent Document 7: Japanese Patent Application Laid-Open No. Hei 09-286,809, Patent Document 8: Japanese Patent Application Laid-Open No. Hei 04-311,714, Patent Document 9: Japanese Patent Application Laid-Open No. 2002-249,680). The composition described in Patent Document 7 contains a urethanepoly(meth)acrylate compound having 6 or more (meth)acrylolyoxy groups in a molecule and thereby weatherability of a cured material of the composition is improved. The composition described in Patent Document 8 contains a urethaneacrylate compound composed of an alicyclic dicarboxylic acid and a polyol and thereby weatherability of a cured material of the composition is improved. The composition described in Patent Document 9 uses a specific acryl-modified polyolefin and thereby an in-mold coating composition having excellent adhesion to a polyolefin base material and weatherability is obtained. In these patent documents, there is no description or suggestion of a conspicuous effect in which weatherability of a cured material of a composition is sharply improved by compounding a caprolactone-modified poly(meth)acrylate of a mono- or poly-pentaerythritol in the composition.

Patent Document 1: Japanese Patent Application Laid-Open No. Sho 56-122,840

Patent Document 2: Japanese Patent Application Laid-Open No. Hei 05-230,397

Patent Document 3: Japanese Patent Application Laid-Open No. Hei 06-128,502

Patent Document 4: Japanese Patent Application Laid-Open No. Hei 08-283,607

Patent Document 5: Japanese Patent Application Laid-Open No. Hei 08-283,608

Patent Document 6: Japanese Patent Application Laid-Open No. 2004-217,879

Patent Document 7: Japanese Patent Application Laid-Open No. Hei 09-286,809

Patent Document 8: Japanese Patent Application Laid-Open No. Hei 04-311,714

Patent Document 9: Japanese Patent Application Laid-Open No. 2002-249,680

DISCLOSURE OF INVENTION

Problem to be Solved by the Invention

The present invention has been completed under the above-mentioned background and it is an object of the present invention to provide a coating composition capable of forming a cured film excellent in weatherability, mar resistance, and adhesion to a base material.

Means for Solving the Problem

The present inventors have diligently investigated to solve the above-mentioned problem and have found that weatherability is improved while mar is maintained by compounding a caprolactone-modified specific urethane(meth)acrylate and another specific component to a coating composition. Further, they have found that generation of cracks in outdoor use for a long period of time is suppressed and weatherability is sharply improved, as compared with the case where a conventionally used poly(meth)acrylate of a mono- or polypentaerythritol is compounded, by compounding a caprolactone-modified poly(meth)acrylate of a mono- or polypentaerythritol and another specific component to a coating composition.

The first mode of the present invention is related to an active energy ray-curable coating composition comprising:

(A) 10 to 70% by mass of a poly(meth)acrylate of a mono- or polypentaerythritol represented by the following formula (1),

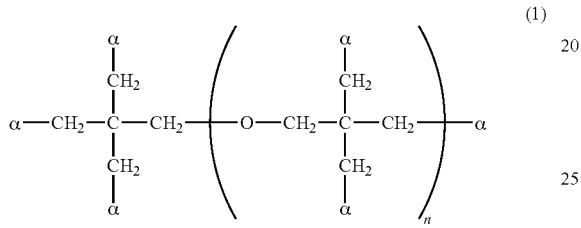
(1)

wherein, in the formula (1), at least three α's among a plurality of α's respectively represent a (meth)acryloyloxy group ($CH_2\!=\!CR\!-\!COO\!-$) or a caprolactone-modified (meth)acryloyloxy group $\{CH_2\!=\!CR\!-\!CO[(O(CH_2)_5C\!=\!O)]_y\!-\!O\!-\!\}$, wherein R represents a hydrogen atom or a methyl group and y represents an integer of 1 or more, and the remaining α's respectively represent a hydroxyl group, and n represents an integer of 0 to 4;

(B) 5 to 50% by mass of (B-1) a polyester type aliphatic urethanedi(meth)acrylate compound which is obtained by reacting an aliphatic isocyanate compound having two isocyanate groups in a molecule, a caprolactone-modified polyester diol, and an acrylate having a hydroxyl group, (B-2) a urethanepoly(meth)acrylate compound represented by the following formula (2), or (B-3) a polyether type urethanedi(meth)acrylate compound having two (meth)acrylolyoxy groups in a molecule, wherein, in the case that component (B) is component (B-3), at least one α among a plurality of α's in component (A) is a caprolactone-modified (meth)acryloyloxy group, wherein, in formula (2), l, m, and n respectively represent an integer of 0 or more and the sum of l, m, and n is one or more, and R represents a hydrogen atom or a methyl group;

(C) 5 to 70% by mass of a poly[(meth)acryloyloxyalkyl] (iso)cyanurate represented by the following formula (3) or (4),

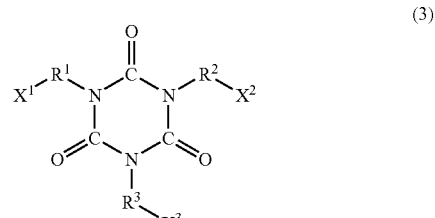

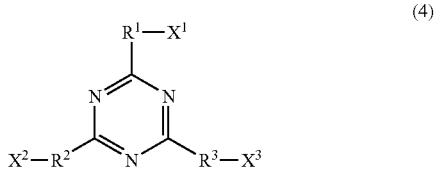

wherein, in formulae (3) and (4), $X^1$, $X^2$, and $X^3$ respectively represent a (meth)acryloyl group ($CH_2\!=\!CR\!-\!CO\!-$), a caprolactone-modified (meth)acryloyl group $\{CH_2\!=\!CR\!-\!CO[O(CH_2)_5C\!=\!O]_z\!-\!\}$, wherein R represents a hydrogen atom or a methyl group and z represents an integer of 1 or more, a hydrogen atom, or an alkyl group, and at least two of $X^1$, $X^2$, and $X^3$ respectively represent the (meth)acryloyl group or the caprolactone-modified (meth)acryloyl group, and $R^1$, $R^2$, and $R^3$ respectively represent an oxyalkylene group or a polyoxyalkylene group; and (D) 0.1 to 10% by mass of a photopolymerization initiator.

The second mode of the present invention is related to the active energy ray-curable coating composition according to the first mode, wherein component (B) is component (B-1) and a polyester type aliphatic urethane di(meth)acrylate compound which is obtained using a caprolactone-modified polyester diol that has weight average molecular weight within the range of from 500 to 1,500.

The third mode of the present invention is related to the active energy ray-curable coating composition according to the first mode, wherein component (B) is component (B-2) and the sum of l, m and n is within the range of from 1 to 15 in the foregoing formula (2).

The fourth mode of the present invention is related to the active energy ray-curable coating composition according to

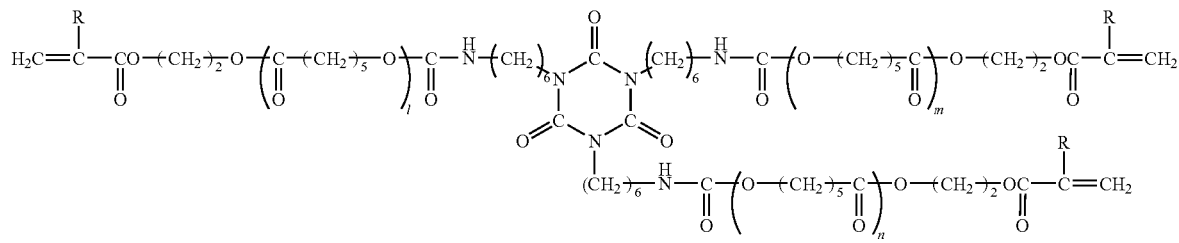
(2)

the first mode, wherein component (B) is component (B-3) and component (A) is a compound in which an average of a sum of modification quantities by caprolactone in a molecule is within the range of from 1 to 6 in the compounds represented by the foregoing formula (1).

The fifth mode of the present invention is related to the active energy ray-curable coating composition according to any one of the first mode to the third mode, further comprising:

(E) 1 to 30% by mass of an ultraviolet absorbent; and
(F) 0.1 to 5% by mass of a hindered amine light stabilizer, wherein component (B) is component (B-1) or (B-2).

The sixth mode of the present invention is related to the active energy ray-curable coating composition according to the fifth mode, which gives a haze value increased between before and after a wear test of a molded article according to JIS K7204 using a wear disc CS-10F at a rotation of 100 times under a load of 4.9N being less than 15, a haze value increased between before and after 3,500 hours of exposure in an accelerated weathering test of the molded article using a sunshine weather meter being less than 10, and a yellow index value (degree of yellowness) after the exposure being less than 5, the molded article being a polycarbonate resin plate of 3 mm in thickness on which a cured film of the active energy ray-curable coating composition having a thickness of 8 μm is provided.

The seventh mode of the present invention is related to the active energy ray-curable coating composition according to the first mode or the fourth mode, further comprising:

(E) 1 to 30% by mass of an ultraviolet absorbent; and
(F) 0.1 to 5% by mass of a hindered amine light stabilizer, wherein component (B) is component (B-3).

The eighth mode of the present invention is related to the active energy ray-curable coating composition according to the seventh mode, which gives a haze value increased between before and after a wear test of a molded article according to JIS K7204 using a wear disc CS-10F at a rotation of 100 times under a load of 4.9N being less than 15, a haze value increased between before and after 4,000 hours of exposure in an accelerated weathering test of the molded article using a sunshine weather meter being less than 10, and a yellow index value (degree of yellowness) after the exposure being less than 5, the molded article being a polycarbonate resin plate of 3 mm in thickness on which a cured film of the active energy ray-curable coating composition having a thickness of 8 μm is provided.

The ninth mode of the present invention is related to a resin molded article made by coating the active energy ray-curable coating composition of the first mode on a surface of a synthetic resin molded article and irradiating an active energy ray on the resultant surface to form a cured film on the surface.

The tenth mode of the present invention is related to the resin molded article according to the ninth mode, wherein the synthetic resin molded article is a polycarbonate resin molded article for automotive headlamp lenses.

EFFECT OF THE INVENTION

A synthetic resin molded article having a cured coating film which is excellent in mar resistance and weatherability and in heat resistance, chemical resistance, durability, and adhesion to a base material can be obtained by coating the coating composition of the present invention on the surface of the synthetic resin molded article and irradiating an active energy ray on the resultant surface.

BEST MODE FOR CARRYING OUT THE INVENTION

The present invention will be explained in detail. At first, each component of the coating composition of the present invention will be explained.

<Component (A)>

The poly(meth)acrylate of a mono- or polypentaerythritol represented by the foregoing formula (1), which is component (A), shows excellent polymerizability by irradiation of an active energy ray and forms a polymer which has a high crosslinking density and is excellent in mar resistance. Consequently, it can form a cured film excellent in mar resistance on the surface of a base material.

As concrete examples of component (A), pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, tripentaerythritol tetra(meth)acrylate, tripentaerythritol penta(meth)acrylate, tripentaerythritol hexa(meth)acrylate, tripentaerythritol hepta(meth)acrylate, and tripentaerythritol octa(meth)acrylate can be listed. Further, caprolactone-modified compounds such as those of formula (1) in which some of α's respectively represent a caprolactone-modified (meth)acryloyloxy group may be used. As component (A), the caprolactone-modified compounds are preferable, and dipentaerythritol hexaacrylate modified by 2 caprolactones per molecule (trade name "KAYARAD DPCA20", manufactured by Nippon Kayaku Co., Ltd.), dipentaerythritol hexaacrylate modified by 3 caprolactones per molecule (trade name "KAYARAD DPCA30", manufactured by Nippon Kayaku Co., Ltd.), dipentaerythritol hexaacrylate modified by 6 caprolactones per molecule (trade name "KAYARAD DPCA60", manufactured by Nippon Kayaku Co., Ltd.), dipentaerythritol hexaacrylate modified by 12 caprolactones per molecule (trade name "KAYARAD DPCA120", manufactured by Nippon Kayaku Co., Ltd.), and the like can be listed. In formula (1), y is preferably 6 or less, more preferably 3 or less, and furthermore preferably 2 or less from the viewpoint of mar resistance of the obtained cured film.

The proportion of use of component (A) is preferably in the range of from 10 to 70% by mass in 100% by mass of the total quantity of components (A) to (D) or of components (A) to (F). The lower limit is more preferably 20% by mass or more and furthermore preferably 25% by mass or more, and the upper limit is more preferably 50% by mass or less. When the quantity of component (A) is 10% by mass or more, mar resistance of the obtained cured film becomes excellent. Further, when the quantity of component (A) is 70% by mass or less, weatherability and heat resistance of the obtained cured film become excellent.

<Component (B)>

The polyester type aliphatic urethane di(meth)acrylate compound (B-1) to be obtained by reacting an aliphatic isocyanate compound having two isocyanate groups in a molecule, a caprolactone-modified polyester diol, and an acrylate having a hydroxyl group, which is one of component (B), is a product of a urethane reaction in which the aliphatic isocyanate compound having two isocyanate groups in a molecule and the caprolactone-modified polyester diol having two hydroxyl groups in a molecule are reacted to synthesize an adduct and then the (meth)acrylate having a hydroxyl group is added to the remaining isocyanate group.

As concrete examples of the aliphatic isocyanate compound having two isocyanate groups in a molecule, polyisocyanate monomers such as ethylene diisocyanate, 1,2-diisocyanatopropane, 1,3-diisocyanatopropane, hexamethylene diisocyanate, lysine isocyanate, 4,4'-methylenebis(cyclohexyl) isocyanate, methylcyclohexane-2,4-diisocyanate, methylcyclohexane-2,6-diisocyanate, 1,3-bis(isocyanatomethyl)cyclohexane, isophorone diisocyanate, trimethylhexamethylene diisocyanate, tetramethylene diisocyanate, dimmer diisocyanate, and 2-isocyanatoethyl-2,6-diisocyanatohexanoate can be listed. Those having alicyclic structures are preferable from the viewpoint of weatherability of the obtained cured film.

As concrete examples of the caprolactone-modified polyester diol to be used for the synthesis of an adduct and having two hydroxyl groups in a molecule, "PLACCEL 205" which is a polycaprolactone diol having weight average molecular weight of 530, "PLACCEL 205BA" which is a polycaprolactone diol having weight average molecular weight of 530 and having a carboxyl group in a side chain, "PLACCEL L205AL" which is a polycaprolactone diol having weight average molecular weight of 500 and being liquid at room temperature, "PLACCEL 205H" which is a polycaprolactone diol having weight average molecular weight of 530 and having a more improved water resistance as compared with "PLACCEL 205", "PLACCEL 205U" which is a polycaprolactone diol having weight average molecular weigh of 530 and having lower viscosity and acid value as compared with "PLACCEL 205", "PLACCEL 208" which is a polycaprolactone diol having weight average molecular weight of 830, "PLACCEL L208AL" which is a polycaprolactone diol having weight average molecular weight of 830 and being liquid at ordinary temperature, "PLACCEL 210" which is a polycaprolactone diol having weight average molecular weight of 1,000, "PLACCEL 210BA" which is a polycaprolactone diol having weight average molecular weight of 1,000 and having a carboxyl group in a side chain, "PLACCEL 210CP" which is a polycaprolactone diol having weight average molecular weigh of 1,000 and having a lower acid value and a more improved water resistance as compared with "PLACCEL 210", "PLACCEL 210N" which is a polycaprolactone diol having weight average molecular weight of 1,000 and having a narrower molecular weight distribution as compared with "PLACCEL 210", "PLACCEL 212" which is a polycaprolactone diol having weight average molecular weight of 1,250, "PLACCEL L212AL" which is a polycaprolactone diol having weight average molecular weight of 1,250 and being liquid at ordinary temperature, "PLACCEL 220" which is a polycaprolactone diol having weight average molecular weight of 2,000, "PLACCEL 220BA" which is a polycaprolactone diol having weight average molecular weight of 2,000 and having a carboxyl group in a side chain, "PLACCEL 220CPB" which is a polycaprolactone diol having weight average molecular weight of 2,000 and having a lower acid value and a more improved water resistance as compared with "PLACCEL 220", "PLACCEL 220N" which is a polycaprolactone diol having weight average molecular weight of 2,000 and having a narrower molecular weight distribution as compared with "PLACCEL 220", "PLACCEL 220NP1" which is a polycaprolactone diol having weight average molecular weight of 2,000 and having a lower crystallinity as compared with "PLACCEL 220", "PLACCEL L220AL" which is a polycaprolactone diol having weight average molecular weight of 2,000 and being liquid at ordinary temperature, "PLACCEL 230" which is a polycaprolactone diol having weight average molecular weight of 3,000, "PLACCEL L230AL" which is a polycaprolactone diol having weight average molecular weight of 3,000 and being liquid at ordinary temperature, "PLACCEL 230CP" which is a polycaprolactone diol having weight average molecular weight of 3,000 and having a lower acid value and a more improved water resistance as compared with "PLACCEL 230", "PLACCEL 240" which is a polycaprolactone diol having weight average molecular weight of 4,000, "PLACCEL 240CP" which is a polycaprolactone diol having weight average molecular weight of 4,000 and having a lower acid value and a more improved water resistance as compared with "PLACCEL 240", "PLACCEL 220EB" which is a polycaprolactone diol having weight average molecular weight of 2,000 and having a more improved hydrolytic resistance as compared with "PLACCEL 220", and "PLACCEL 220EC" which is a polycaprolactone diol having weight average molecular weight of 2,000 and having a higher strength as compared with "PLACCEL 220EB" (all of which are trade names and manufactured by Daicel Chemical Industries, Ltd.) can be listed.

Among these compounds, those having weight average molecular weight within the range of from 500 to 1,500 is preferable and those from 500 to 1,000 is more preferable from the viewpoint of weatherability and mar resistance of the obtained cured film.

As concrete examples of the (meth)acrylate having a hydroxyl group, in addition to 2-hydroxyethyl (meth)acrylate, 2-hydroxypropyl (meth)acrylate, 2-hydroxybutyl (meth) acrylate, 4-hydroxybutyl (meth)acrylate, and the like, addition reaction products of (meth)acrylic acid and a monoepoxy compound such as butyl glycidyl ether, 2-ethylhexyl glycidyl ether, or glycidyl methacrylate; mono(meth)acrylic acid ester of polyethylene glycol or polypropylene glycol; and a mono (meth)acrylic acid ester of polycaprolactone diol can be listed.

The reaction of the aliphatic isocyanate compound having two isocyanate groups in a molecule, the caprolactone-modified polyester diol, and the (meth)acrylate having a hydroxyl group is carried out using raw materials in such a way that the quantities of isocyanate group and hydroxyl group become almost equal while heating these raw materials for several hours at 60 to 70° C. in the presence of a tin based catalyst such as di-n-butyltin dilaurate. The reaction product is generally highly viscous and hence it is preferably diluted with an organic solvent or a diluting monomer during the reaction or after the reaction is finished.

Component (B-2) which is the other of component (B) is a urethane poly(meth)acrylate compound represented by the following formula (2).

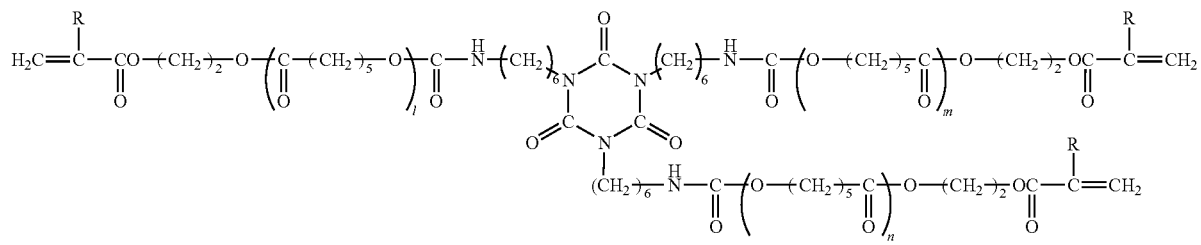

(2)

In formula (2), l, m and n respectively represent an integer of 0 or more and the sum of l, m and n is one or more, and R represents a hydrogen atom or a methyl group.

As the urethane poly(meth)acrylate compound represented by formula (2), a urethane reaction product obtained by reacting an aliphatic isocyanate compound having three isocyanate groups in a molecule and a mono(meth)acrylic acid ester of a polycaprolactone diol can be listed.

For example, the foregoing product can be obtained by carrying out the reaction of a trimer of hexamethylene diisocyanate (trade name "DURANATE TPA100", manufactured by Asahi Kasei Chemicals Corporation) and a mono(meth) acrylic acid ester of a polycaprolactone diol, using these compounds in such a way that the quantities of isocyanate group and hydroxyl group become almost equal while heating these compounds for several hours at 60 to 70° C. in the presence of a tin based catalyst such as di-n-butyltin dilaurate.

Among the urethane poly(meth)acrylate compounds represented by formula (2), those having the sum of modification quantities by caprolactone (l+m+n) within the range of from 1 to 15 is particularly preferable from the viewpoint of mar resistance and weatherability of the obtained cured film.

The polyether type urethane di(meth)acrylate compound having two (meth)acrylolyoxy groups in a molecule of component (B-3) which is the other of component (B) is a component that improves tenacity, flexibility, heat resistance, and weatherability of the obtained cured film, and as an example of it, a product of a urethane reaction in which an isocyanate compound having two isocyanate groups in a molecule and a polyether diol compound having two hydroxyl groups in a molecule are reacted to synthesize an adduct and then the (meth)acrylate having a hydroxyl group is added to the remaining isocyanate group can be listed. This is a component that can improve tenacity, flexibility, and the like of the obtained cured film. The molecular weight of the polyether type urethanedi(meth)acrylate compound is preferably in the range of from 1,000 to 5,000 in point of improving adhesion of the obtained cured film to a base material.

As concrete examples of the isocyanate compound having two isocyanate groups in a molecule, trilenediisocyanate, ethylenediisocyanate, 1,2-diisocyanatopropane, 1,3-diisocyanatopropane, 4,4'-diphenylmethane diisocyanate, xylylene diisocyanate, tetramethylxylylene diisocyanate, hexamethylene diisocyanate, lysine isocyanate, 4,4'-methylenebis(cyclohexyl)isocyanate, methylcyclohexane-2,4-diisocyanate, methylcyclohexane-2,6-diisocyanate, 1,3-bis(isocyanatomethyl)cyclohexane, isophorone diisocyanate, trimethylhexamethylene diisocyanate, tetramethylene diisocyanate, and a dimmer acid diisocyanate can be listed. An aliphatic isocyanate compound having an alicyclic structure is preferable from the viewpoint of weatherability.

The polyether diol compound having two hydroxyl groups in a molecule to be used in the synthesis of the adduct is not particularly limited, and concrete examples of it include polyethylene glycol, polypropylene glycol, polybutylene glycol, and polytetramethylene glycol.

As concrete examples of the (meth)acrylate having a hydroxyl group, in addition to 2-hydroxyethyl (meth)acrylate, 2-hydroxypropyl (meth)acrylate, 2-hydroxybutyl (meth) acrylate, 4-hydroxybutyl (meth)acrylate, pentaerythritol triacrylate, and the like, addition reaction products of (meth) acrylic acid and a monoepoxy compound such as butyl glycidyl ether, 2-ethylhexyl glycidyl ether, or glycidyl methacrylate; and mono(meth)acrylic acid ester of polyethylene glycol or polypropylene glycol can be listed.

The reaction of the isocyanate compound having two isocyanate groups in a molecule, the polyether diol compound having two hydroxyl groups in a molecule, and the (meth) acrylate having a hydroxyl group is carried out using raw materials in such a way that the quantities of isocyanate group and hydroxyl group become almost equal while heating these raw materials for several hours at 60 to 70° C. in the presence of a tin based catalyst such as di-n-butyltin dilaurate. The reaction product is generally highly viscous and hence it is preferably diluted with an organic solvent or a diluting monomer during the reaction or after the reaction is finished.

In the case that component (B) is component (B-3), at least one α among a plurality of α's in component (A) represents a caprolactone-modified (meth)acryloyloxy group.

The proportion of use of component (B) is preferably in the range of from 5 to 50% by mass in 100% by mass of the total quantity of components (A) to (D) or of components (A) to (F). The lower limit is more preferably 10% by mass or more and the upper limit is more preferably 30% by mass or less. When the quantity of component (B) is 5% by mass or more, weatherability of the obtained cured film and curability under air atmosphere become excellent. Further, when the quantity of component (B) is 50% by mass or less, mar resistance of the obtained cured film becomes excellent.

<Component (C)>

The poly [(meth)acryloyloxyalkyl](iso)cyanurate represented by the foregoing formula (3) or (4), which is component (C), shows excellent polymerizability by an active energy ray, and can improve tenacity and heat resistance of the obtained cured film without deteriorating mar resistance.

In the general formulae (3) and (4), z is preferably 5 or less, more preferably 3 or less, and furthermore preferably 2 or less from the viewpoint of mar resistance of the obtained cured film.

As concrete examples of component (C), bis(2-acryloyloxyethyl)hydroxyethylisocyanurate, tris(2-acryloyloxyethyl)isocyanurate, bis(2-acryloyloxypropyl)hydroxyethylisocyanurate, tris(2-acryloyloxypropyl)isocyanurate, bis(2-acryloyloxyethyl)hydroxyethylcyanurate, tris(2-acryloyloxyethyl)cyanurate, bis(2-acryloyloxypropyl)hydroxyethylcyanurate, tris(2-acryloyloxypropyl)cyanurate, tris[(2-acryloyloxyethyl)carbonylamidehexyl]isocyanurate, tris[(2-acryloyloxyethyl)carbonylamidehexyl]cyanurate, tris(2-acryloyloxyethyl)isocyanurate modified by one caprolactone per molecule (trade name "ARONIX M-325", manufactured by Toagosei Co., Ltd.), and tris(2-acryloyloxyethyl)isocyanurate modified by three caprolactones per molecule (trade name "ARONIX M-327", manufactured by Toagosei Co., Ltd.) can be listed.

The proportion of use of component (C) is preferably in the range of from 5 to 70% by mass in 100% by mass of the total quantity of components (A) to (D) or components (A) to (F). The lower limit is more preferably 20% by mass or more and the upper limit is more preferably 60% by mass or less. When the quantity of component (C) is 5% by mass or more, mar resistance and heat resistance of the obtained cured film become excellent. Further, when the quantity of component (C) is 70% by mass or less, curability of the coating composition becomes excellent.

<Component (D)>

As the photopolymerization initiator which is component (D), any substance can be used as long as it can initiate polymerization of an acrylic monomer or oligomer by irradiation of an active energy ray. Concretely, carbonyl compounds such as benzoin, benzoin monomethyl ether, benzoin isopropyl ether, acetoin, benzil, benzophenone, p-methoxybenzophenone, diethoxyacetophenone, benzyldimethylketal, 2,2-diethoxyacetophenone, 1-hydroxycyclohexylphenyl ketone, methylphenyl glyoxylate, ethylphenyl glyoxylate, and 2-hydroxy-2-methyl-1-phenylpropan-1-on, sulfur compounds such as tetramethylthiuram monosulfide, and tetramethylthiuram disulfide, and acylphosphinoxide such as 2,4,6-trimethylbenzoyidiphenylphosphinoxide can be listed. These compounds can be used alone or as a mixture of two or more kinds.

Among them, benzophenone, benzoin isopropyl ether, methylphenyl glyoxylate, and benzyldimethylketal are more preferable.

The proportion of use of component (D) is preferably in the range of from 0.1 to 10% by mass in 100% by mass of the total quantity of components (A) to (D) or components (A) to (F). The lower limit is more preferably 1% by mass or more and the upper limit is more preferably 5% by mass or less. When the quantity of component (D) is 0.1% by mass or more, curability of the coating composition becomes excellent. Further, when the quantity of component (D) is 10% by mass or less, transparency and weatherability of the obtained cured film become excellent.

In order to protect deterioration of the base material, on which the active energy ray-curable coating composition of the present invention is coated, caused by an ultraviolet ray, the active energy ray-curable coating composition preferably further contains components (E) and (F).

<Component (E)>

The ultraviolet absorbent which is component (E) is not particularly limited and one that can uniformly dissolve in a composition and is excellent in weatherability can be used. However, it is preferably a compound which is derived from a triazine-based compound, benzophenone-based compound, benzotriazol-based compound, phenyl salicylate-based compound, or phenylbenzoate-based compound and has a maximum absorption wavelength in the range of from 240 to 380Nm as an ultraviolet absorbent from the viewpoint of an excellent solubility in the composition and an effect on improvement of weatherability. In particular, it is preferably a benzophenone-based ultraviolet absorbent because it can be contained in a large quantity in the composition, and preferably a triazine-based or benzotriazol-based ultraviolet absorbent because it can protect yellowing of a base material such as polycarbonate.

As concrete examples of component (E), a mixture of 2-[4-(2-hydroxy-3-dodecyloxy-propyl)oxy-2-hydroxyphenyl]-4,6-[bis(2,4-dimethylphenyl)-1,3,5-triazine and 2-[4-(2-hydroxy-3-tridecyloxy-propyl)oxy-2-hydroxyphenyl]-4,6-[bis(2,4-dimethylphenyl)-1,3,5-triazine (trade name "Tinuvin 400", manufactured by Ciba Specialty Chemicals Holding Inc.), 2-[4-(octyl-2-methylethanoate)oxy-2-hydroxyphenyl]-4,6-[bis(2,4-dimethylphenyl)]-1,3,5-triazine (trade name "Tinuvin 479", manufactured by Ciba Specialty Chemicals Holding Inc.), tris[2,4,6-[2-{4-(octyl-2-methylethanoate)oxy-2-hydroxyphenyl}]-1,3,5-triazine (trade name "Tinuvin 777", manufactured by Ciba Specialty Chemicals Holding Inc.), 2-hydroxybenzophenone, 5-chloro-2-hydroxybenzophenone, 2,4-dihydroxybenzophenone, 2-hydroxy-4-methoxybenzophenone, 2-hydroxy-4-octyloxybenzophenone, 4-dodecyloxy-2-hydroxybenzophenone, 2-hydroxy-4-octadecyloxybenzophenone, 2,2'-dihydroxy-4-methoxybenzophenone, 2,2'-dihydroxy-4,4'-dimethoxybenzophenone, phenyl salicylate, p-tert-butylphenyl salicylate, p-(1,1,3,3-tetramethylbutyl)phenyl salicylate, 3-hydroxyphenyl benzoate, phenylene-1,3-dibenzoate, 2-(2-hydroxy-5'-methylphenyl)benzotriazole, 2-(2-hydroxy-5-tert-butylphenyl)-5-chlorobenzotriazole, 2-(2-hydroxy-3,5-di-tert-butylphenyl)benzotriazole, 2-(2-hydroxy-5-tert-butylphenyl)benzotriazole, 2-(2-hydroxy-4-octylphenyl)benzotriazole, and 2-(2'-hydroxy-5'-methacryloxyethylphenyl)-2H-benzotriazole can be listed. Among these compounds, a mixture of 2-[4-(2-hydroxy-3-dodecyloxypropyl)oxy-2-hydroxyphenyl]-4,6-[bis(2,4-dimethylphenyl)-1,3,5-triazine and 2-[4-(2-hydroxy-3-tridecyloxy-propyl)oxy-2-hydroxyphenyl]-4,6-[bis(2,4-dimethylphenyl)-1,3,5-triazine, 2-[4-(octyl-2-methylethanoate)oxy-2-hydroxyphenyl]-4,6-[bis(2,4-dimethylphenyl)]-1,3,5-triazine, and 2-(2-hydroxy-5-tert-butylphenyl)benzotriazole which is a benzotriazole-based compound are particularly preferable, and it is more preferable to jointly use two or more of these compounds.

The proportion of use of component (E) is preferably in the range of from 1 to 30% by mass in 100% by mass of the total quantity of components (A) to (F). The lower limit is more preferably 5% by mass or more and the upper limit is more preferably 15% by mass or less. When the quantity of component (E) is 1% by mass or more, each weatherability of the obtained cured film and a base material becomes excellent. Further, when the quantity of component (E) is 30% by mass or less, curability of the coating composition, and tenacity, heat resistance, and mar resistance of the obtained cured film become excellent.

<Component (F)>

As the hindered amine light stabilizer which is component (F), publicly known hindered amine light stabilizers can be used, and concretely, bis(2,2,6,6-tetramethyl-4-piperidyl)sebacate, bis(1,2,2,6,6-pentamethyl-4-piperidyl)sebacate, bis(1-methoxy-2,2,6,6-tetramethyl-4-piperidyl)sebacate, bis(1-ethoxy-2,2,6,6-tetramethyl-4-piperidyl)sebacate, bis(1-propoxy-2,2,6,6-tetramethyl-4-piperidyl)sebacate, bis(1-butoxy-2,2,6,6-tetramethyl-4-piperidyl)sebacate, bis(1-pentyloxy-2,2,6,6-tetramethyl-4-piperidyl)sebacate, bis(1-hexyloxy-2,2,6,6-tetramethyl-4-piperidyl)sebacate, bis(1- heptyloxy-2,2,6,6-tetramethyl-4-piperidyl)sebacate, bis(1-octoxy-2,2,6,6-tetramethyl-4-piperidyl)sebacate, bis(1-nonyloxy-2,2,6,6-tetramethyl-4-piperidyl)sebacate, bis(1-decanyloxy-2,2,6,6-tetramethyl-4-piperidyl)sebacate, bis(1-dodecyloxy-2,2,6,6-tetramethyl-4-piperidyl)sebacate, bis(1,2,2,6,6-pentamethyl-4-piperidyl)-2-(4-methoxy-benzylidene)malonate, tetrakis(2,2,6,6-pentamethyl-4-piperidyl) 1,2,3,4-butane tetracarboxylate, tetrakis(1,2,2,6,6-pentamethyl-4-piperidyl)1,2,3,4-butane tetracarboxylate, a condensate of 1,2,3,4-butane tetracarboxylic acid, 1,2,2,6,6-pentamethyl-4-piperidinol, and β,β,β,β-tetramethyl-3,9-(2,4,8,10-tetraoxaspiro[5,5]undecane)diethanol, a condensate of 1,2,3,4-butane tetracarboxylic acid, 2,2,6,6-pentamethyl-4-piperidinol, and β,β,β,β-tetramethyl-3,9-(2,4,8,10-tetraoxaspiro[5,5]undecane)diethanol, and the like can be listed, and among them, bis(2,2,6,6-tetramethyl-4-piperidyl)sebacate is particularly preferable.

The proportion of use of component (F) is preferably in the range of from 0.1 to 5% by mass in 100% by mass of the total quantity of components (A) to (F). The lower limit is more preferably 0.5% by mass or more and the upper limit is more preferably 2% by mass or less. When the quantity of component (F) is 0.1% by mass or more, weatherability of the obtained cured film and a base material become excellent. Further, when the quantity of component (F) is 5% by mass or less, curability of the coating component, and tenacity, heat resistance, and mar resistance of the obtained cured film become excellent.

The coating composition of the present invention contains the foregoing components (A), (B), (C) and (D), and in some cases, further contains components (E) and (F), and may contain various additives such as organic solvents, antioxidants, yellowing-preventive agents, bluing agents, pigments, leveling agents, defoaming agents, viscosity increasers, anti-settling agents, antistatic agents, and anti-clouding agents, if necessary. Organic solvents are preferably selected for use in accordance with the kinds of base materials. For example, when polycarbonate is used as the base material, it is preferable to use one kind of alcohol solvents such as isobutanol and ester solvents such as n-butyl acetate or a combination of two or more kinds of them.

In order to coat the coating composition of the present invention on the base material, various methods can be used such as blush coating, spray coating, dip coating, spin coating, and curtain coating, however, it is preferable to coat after adding a proper organic solvent to the coating composition in point of coating workability of the coating composition, smoothness and uniformity of coating, and improvement of adhesion of the obtained cured film to the base material. Further, the coating composition may be coated after heated in order to adjust the viscosity.

The coating composition of the present invention forms a cured film after coated on the base material and crosslinked by irradiation of an active energy ray. When the coating composition is cured by the irradiation of the active energy ray, the coating composition is coated on the base material preferably with a thickness of 1 to 50 μm and more preferably with the thickness of 3 to 20 μm, and an ultraviolet ray at a wavelength of 340 to 380 nm is irradiated on the resultant coating composition using a high pressure mercury lamp, metal halide lamp, or the like in such a way that the dose of the irradiation can become 1,000 to 5,000 mJ/cm². The atmosphere of the irradiation may be air or an inert gas such as nitrogen or argon.

The coating composition of the present invention can be used for improvement of the surfaces of various synthetic resin molded articles, which are the base materials, and as the synthetic resin molded articles, various thermoplastic resins and thermosetting resins to which there has conventionally been a demand for improvement of mar resistance or weatherability can be listed. Concretely, polymethylmethacrylate resins, polycarbonate resins, polyester resins, polystyrene resins, ABS resins, AS resins, polyamide resins, polyarylate resins, polymethacrylimide resins, and polyallyidiglycolcarbonate resins can be listed. In particular, it is particularly effective to apply the coating composition of the present invention to polymethylmethacrylic resins, polycarbonate resins, polystyrene resins, and polymethacrylimide resins because these resins are excellent in transparency and a demand for improvement of mar resistance of these resins is strong. The synthetic resin molded articles mean sheet type molded articles, film type molded articles, and various injection molded articles from these resins.

The cured film of the coating composition of the present invention is excellent in mar resistance and weatherability. In the case that a molded article is a polycarbonate resin plate of 3 mm in thickness on which a cured film having a thickness of 8 μm using the coating composition of the present invention is provided, in which component (B) is component (B-1) or (B-2), and components (E) and (F) are further contained, a haze value increased between before and after a wear test of the molded article according to JIS K7204 using a wear disc CS-10F at a rotation of 100 times under a load of 4.9N becomes less than 15, and a haze value increased between before and after 3,500 hours of exposure in an accelerated weathering test of the molded article using a sunshine weather meter becomes less than 10, and a yellow index value (degree of yellowness) after the exposure becomes less than 5. Further, in the case that a molded article is a polycarbonate resin plate of 3 mm in thickness on which a cured film having a thickness of 8 μm using the coating composition of the present invention is provided, in which component (B) is component (B-3) and at least one α among a plurality of α's in component (A) is a caprolactone-modified (meth)acryloyloxy group and components (E) and (F) are further contained, a haze value increased between before and after a wear test of the molded article according to JIS K7204 using the wear disc CS-10F at a rotation of 100 times under a load of 4.9N becomes less than 15, a haze value increased between before and after 4,000 hours of exposure in an accelerated weathering test of the molded article using a sunshine weather meter becomes less than 10, and a yellow index value (degree of yellowness) after the exposure becomes less than 5.

In the case that the haze value before the wear test or before the exposure was 1.0% and the one after the wear test or after the exposure was 5.0%, each haze value increased was expressed as 4.0 (which equals to 5.0 minus 1.0).

Consequently, the resin molded article on which a cured film is formed by coating the coating composition of the present invention on a polycarbonate molded-article followed by irradiating an active energy ray on the resultant molded article is suitable for the polycarbonate molded-articles for automotive headlamp lenses.

EXAMPLES

Hereinafter, the present invention will be explained in more detail using examples and comparative examples. Further, measurements and evaluations in the examples were carried out in the following manners.

(1) Appearance of a Cured Film

Appearance of a cured film using a coating composition after coated and cured was evaluated by visual inspection. A surface which was smooth and transparent was evaluated as "○" and the one which had whitening or clouding was evaluated as "x".

(2) Mar Resistance of a Cured Film

According to JIS K7204 "Mar resistance test of plastics using a wear disc", a cured film was worn with Rotary Abrasion Tester (manufactured by Toyo Seiki Seisaku-sho, Ltd.) using a wear disc CS-10F at a rotation of 100 times under a load of 4.9N (500 gf, and diffuse transmittance (haze value) of the resultant cured film was measured with a haze meter ("HM-65W" (trade name), manufactured by Murakami Color Research Laboratory), and evaluation of mar resistance was carried out. The standard of evaluation of mar resistance is as follows.

⊚: A haze value increased is from 0 to less than 10.

○: A haze value increased is from 10 to less than 15.

x: A haze value increased is 15 or more.

(3) Adhesion Properties

A cut of grid shape having 1 mm intervals and having a depth that reaches to a base material was formed on a cured film to make 100 squares of 1 mm² area, and cellophane tape (trade name "Cello-tape", manufactured by Nichiban Co., Ltd.) was pasted on the resultant surface. Then the tape was peeled off and the number of the squares that have been peeled off was counted. When there is no peel off, the result was evaluated as "○" and when there is peel off, the result was evaluated as "x".

(4) Heat Resistance

A resin plate having a cured film was put in a hot air dryer at 120° C. for 24 hours, and change of appearance of the cured film was visually observed. When there is no change, the result was evaluated as "○" and when there is a crack generation, the result was evaluated as "x". In the cases of Examples 1-6 and 2-6, and Comparative Examples 1-8 and 2-9, the evaluations were carried at 80° C.

(5) Weatherability

A sample was tested using a sunshine carbon weather meter ("WEL-SUN-HC-B type" weather meter manufactured by Suga Test Instruments Co., Ltd.) with a black panel temperature of 63±3° C. and a cycle of raining for 12 minutes and irradiation for 48 minutes. When component (B) is component (B-1) or (B-2) (Examples 1-1 to 1-11 and Comparative Examples 1-1 to 1-8), changes of the cured films after the exposure of 2,500 and 3,500 hours were observed and adhesion properties were tested. When component (B) is component (B-3) (Examples 2-1 to 2-6 and Comparative Examples 2-1 to 2-9), changes of the cured films after the exposure of 3,000 and 4,000 hours were observed and adhesion properties were tested.

(a) Appearance

When there was no generation of crack and peel off of the cured film, the result was evaluated as "○" and when there was a generation of crack and peel off, the result was evaluated as "x".

(b) Transparency

Haze values of a cured film before and after the test were measured with a haze meter ("HM-65W" (trade name), manufactured by Murakami Color Research Laboratory).

⊚: A haze value increased is from 0 to less than 5.

○: A haze value increased is from 5 to less than 10.

x: A haze value increased is 10 or more.

(c) Degree of Yellowness

Yellow index value of a cured film was measured using a multichannel photodetector (trade name "MCPD-3000", manufactured by Otsuka Electronics Co., Ltd.).

⊚: Yellow index value (YI) is from 0 to less than 5.

○: Yellow index value (YI) is from 5 to less than 10.

x: Yellow index value (YI) is 10 or more.

(d) Adhesion Properties

The aforementioned test for adhesion properties was carried out.

Synthesis Example 1

UA 1 to UA 4 and UA 10 to UA12

To a flask equipped with a dropping funnel having a heat insulation function, reflux condenser, stirring blade, and temperature sensor, 2 moles of a diisocyanate compound and 300 ppm of di-n-butyltin dilaurate were charged and the resultant mixture was heated to 40° C. To the resultant mixture, 1 mole of a caprolactone-modified polyester diol compound was dropped from the dropping funnel having a heat insulation function being heated at 40° C. over the period of 4 hours. The resultant mixture was stirred at 40° C. for 2 hours and then heated to 70° C. over the period of 1 hour. Subsequently, 2 moles of a (meth)acrylate compound having a hydroxyl group was dropped to the resultant mixture over the period of 2 hours and the resultant mixture was stirred for 2 hours to synthesize each component. Details of respective raw materials are shown in Table 3.

Synthesis Example 2

UA 6 to UA 9 and UA 13 and UA 14

To a flask equipped with a dropping funnel, reflux condenser, stirring blade, and temperature sensor, 1 mole of a polyisocyanate compound and 300 ppm of di-n-butyltin dilaurate were charged and the resultant mixture was heated to 70° C. Subsequently, 3 moles of a (meth)acrylate compound having a hydroxyl group was dropped to the resultant mixture over the period of 4 hours and the resultant mixture was stirred for 2 hours to synthesize each component. Details of respective raw materials are shown in Table 3.

Example 1-1

A coating composition was prepared according to the compounding ratio shown in Table 1 and coated on a polycarbonate resin plate of 3 mm in thickness (trade name "LEXAN LS-2" manufactured by General Electric Co.) by spray coating in such a way that the obtained cured film has a thickness of 8 μm. The resultant plate was subjected to heat treatment at 80° C. for 3 minutes in an oven to volatilize organic solvents and an energy of 3,000 mJ/cm² (the value measured with an ultraviolet actinometric meter "UV-351 (SN type)", manufactured by ORC Manufacturing Co., Ltd.) of accumulated light quantity at a wavelength of 340 to 380Nm was irradiated on the resultant plate using a high pressure mercury lamp in air to obtain a cured film. The evaluation results of the obtained cured film are shown in Table 1.

Examples 1-2 to 1-4, Examples 1-7 to 1-11, and Comparative Examples 1-1 to 1-7

Coating compositions were prepared according to the compounding ratios shown in Tables 1 and 2 and cured films were obtained with the same condition as in Example 1-1. The evaluation results of the obtained cured films are shown in Tables 1 and 2.

Example 1-6

A coating composition was prepared according to the compounding ratio shown in Table 1 and coated on a polymethylmethacrylate resin plate of 3 mm in thickness (trade name "ACRYPET VH", manufactured by Mitsubishi Rayon Co., Ltd.) by spray coating in such a way that the obtained cured film has a thickness of 8 μm. The resultant plate was subjected to heat treatment at 80° C. for 3 minutes in an oven to volatilize organic solvents and an energy of 3,000 mJ/cm$^2$ (the value measured with an ultraviolet actinometric meter "UV-351 (SN type)", manufactured by ORC Manufacturing Co., Ltd.) of accumulated light quantity at a wavelength of 340 to 380Nm was irradiated on the resultant plate using a high pressure mercury lamp in air to obtain a cured film. The evaluation results of the obtained cured film are shown in Table 1.

Comparative Example 1-8

A coating composition was prepared according to the compounding ratio shown in Table 2 and a cured film was obtained with the same condition as in Example 1-6. The evaluation results of the obtained cured film are shown in Table 2.

TABLE 1

|  |  |  | Examples |  |  |  |  |  |
|---|---|---|---|---|---|---|---|---|
|  |  |  | 1-1 | 1-2 | 1-3 | 1-4 | 1-6 | 1-7 |
| Coating composition | Component (A) |  | DPHA 30 | DPHA 38 | DPHA 58 | DPHA 35 | DPHA 30 | DPHA 15 |
|  | Component (B) |  | UA1 24 | UA2 19 | UA3 20 | UA4 20 | UA6 30 | UA7 15 |
|  | Component (C) |  | TAIC 32 | BAIC 30 | TAIC 13 | TAIC 33 | TAIC-3C 30 | TAIC 58.5 |
|  | Component (D) |  | BNP 3 — — | BNP 3 — — | BNP 1 MPG 2 | BNP 3 — — | BNP 3 — — | BNP 1 MPG 2 |
|  | Component (E) |  | HBPB 10 | HBPB 9.5 | OHBT 5 | HHBT 8 | OHBT 5 | HHBT 8 |
|  | Component (F) |  | BTPS 1 | BTPS 0.5 | BTPS 1 | BTPS 1 | BTPS 2 | BTPS 0.5 |
|  | Subtotal |  | 100 | 100 | 100 | 100 | 100 | 100 |
|  | Isobutanol |  | 50 | 50 | 50 | 50 | 50 | 50 |
|  | N-butyl acetate |  | 60 | 60 | 60 | 60 | 60 | 60 |
|  | PGM |  | 70 | 70 | 70 | 70 | 70 | 70 |
|  | MIBK |  | 40 | 40 | 40 | 40 | 40 | 40 |
|  | Subtotal |  | 220 | 220 | 220 | 220 | 220 | 220 |
|  | Total |  | 320 | 320 | 320 | 320 | 320 | 320 |
| Initial properties | (1) Appearance |  | ○ | ○ | ○ | ○ | ○ | ○ |
|  | (2) Mar resistance |  | ◎ | ◎ | ◎ | ○ | ◎ | ◎ |
|  | (Haze value increased) |  | 7.5 | 8.2 | 8.7 | 12.2 | 7.4 | 7.6 |
|  | (3) Adhesion properties |  | ○ | ○ | ○ | ○ | ○ | ○ |
|  | (4) Heat resistance |  | ○ | ○ | ○ | ○ | ○ | ○ |
| (5) Weatherability | 2,500 hours | (a) Appearance | ○ | ○ | ○ | ○ | ○ | ○ |
|  |  | (b) Transparency | ◎ | ◎ | ◎ | ◎ | ◎ | ◎ |
|  |  | (Haze value increased) | 1.1 | 1.2 | 3.8 | 1.2 | 0.9 | 1.0 |
|  |  | (c) Degree of yellowness | ◎ | ◎ | ◎ | ◎ | ◎ | ◎ |
|  |  | (YI value) | 1.9 | 1.8 | 1.8 | 1.9 | 2.3 | 1.9 |
|  |  | (d) Adhesion properties | ○ | ○ | ○ | ○ | ○ | ○ |
|  | 3,500 hours | (a) Appearance | ○ | ○ | ○ | ○ | ○ | ○ |
|  |  | (b) Transparency | ◎ | ◎ | ○ | ◎ | ◎ | ◎ |
|  |  | (Haze value increased) | 2.8 | 2.9 | 7.9 | 2.8 | 3.2 | 2.8 |
|  |  | (c) Degree of yellowness | ◎ | ◎ | ◎ | ◎ | ◎ | ◎ |
|  |  | (YI value) | 2.9 | 3.8 | 4.1 | 2.8 | 3.4 | 2.8 |
|  |  | (d) Adhesion properties | ○ | ○ | ○ | ○ | ○ | ○ |

|  |  | Examples |  |  |  |
|---|---|---|---|---|---|
|  |  | 1-8 | 1-9 | 1-10 | 1-11 |
| Coating composition | Component (A) | DPHA 40 | DPHA 40 | DPCA20 30 | DPCA20 30 |
|  | Component (B) | UA8 41.5 | UA9 24 | UA1 24 | UA6 30 |
|  | Component (C) | TAIC-1C 7 | TAIC 26 | TAIC 32 | TAIC-3C 30 |

TABLE 1-continued

|  |  |  |  |  |  |
|---|---|---|---|---|---|
|  | Component (D) | BNP 1 | BNP 3 | BNP 3 | BNP 3 |
|  |  | MPG 2 | — | — | — |
|  | Component (E) | HHBT 8 | HBPB 6 | HBPB 10 | OHBT 5 |
|  | Component (F) | BTPS 0.5 | BTPS 1 | BTPS 1 | BTPS 2 |
|  | Subtotal | 100 | 100 | 100 | 100 |
|  | Isobutanol | 50 | 50 | 50 | 50 |
|  | N-butyl acetate | 60 | 60 | 60 | 60 |
|  | PGM | 70 | 70 | 70 | 70 |
|  | MIBK | 40 | 40 | 40 | 40 |
|  | Subtotal | 220 | 220 | 220 | 220 |
|  | Total | 320 | 320 | 320 | 320 |
| Initial properties | (1) Appearance | ○ | ○ | ○ | ○ |
|  | (2) Mar resistance | ⊚ | ○ | ⊚ | ⊚ |
|  | (Haze value increased) | 6.8 | 10.9 | 7.9 | 7.6 |
|  | (3) Adhesion properties | ○ | ○ | ○ | ○ |
|  | (4) Heat resistance | ○ | ○ | ○ | ○ |
| (5) Weatherability 2,500 hours | (a) Appearance | ○ | ○ | ○ | ○ |
|  | (b) Transparency | ⊚ | ⊚ | ⊚ | ⊚ |
|  | (Haze value increased) | 1.3 | 1.4 | 0.8 | 0.6 |
|  | (c) Degree of yellowness | ⊚ | ⊚ | ⊚ | ⊚ |
|  | (YI value) | 2.8 | 3.4 | 1.7 | 1.6 |
|  | (d) Adhesion properties | ○ | ○ | ○ | ○ |
| 3,500 hours | (a) Appearance | ○ | ○ | ○ | ○ |
|  | (b) Transparency | ⊚ | ⊚ | ⊚ | ⊚ |
|  | (Haze value increased) | 2.1 | 3.3 | 1.2 | 1.5 |
|  | (c) Degree of yellowness | ⊚ | ⊚ | ⊚ | ⊚ |
|  | (YI value) | 3.9 | 4.7 | 2.1 | 2.2 |
|  | (d) Adhesion properties | ○ | ○ | ○ | ○ |

TABLE 2

|  |  | Comparative Examples | | | | | | | |
|---|---|---|---|---|---|---|---|---|---|
|  |  | 1-1 | 1-2 | 1-3 | 1-4 | 1-5 | 1-6 | 1-7 | 1-8 |
| Coating composition | Component (A) | DPHA 40 | DPHA 35 | DPHA 32 | DPHA 35 | DPHA 40 | DPHA 75 | DPHA 5 | DPHA 40 |
|  | Component (B) | UA10 24 | UA11 45 | UA12 15 | UA13 24 | UA14 30 | UA3 8 | UA6 25 | — |
|  | Component (C) | TAIC 26 | TAIC-1C 7 | TAIC-3C 46.5 | TAIC 31 | TAIC 20 | TAIC 8 | TAIC 58.5 | TAIC 51.5 |
|  | Component (D) | BNP 3 | BNP 3 | BNP 1 | BNP 3 | BNP 3 | BNP 1 | BNP 3 | BNP 1 |
|  |  | — | — | MPG 2 | — | — | MPG 2 | — | MPG 2 |
|  | Component (E) | HBPB 6 | HHBT 9.5 | HBPB 3 | HBPB 6 | HBPB 6 | HHBT 5 | OHBT 8 | OHBT 3 |
|  | Component (F) | BTPS 1 | BTPS 0.5 | BTPS 0.5 | BTPS 1 | BTPS 1 | BTPS 1 | BTPS 0.5 | BTPS 2.5 |
|  | Subtotal | 100 | 100 | 100 | 100 | 100 | 100 | 100 | 100 |
|  | Isobutanol | 50 | 50 | 50 | 50 | 50 | 50 | 50 | 50 |
|  | N-butyl acetate | 60 | 60 | 60 | 60 | 60 | 60 | 60 | 60 |
|  | PGM | 70 | 70 | 70 | 70 | 70 | 70 | 70 | 70 |
|  | MIBK | 40 | 40 | 40 | 40 | 40 | 40 | 40 | 40 |
|  | Subtotal | 220 | 220 | 220 | 220 | 220 | 220 | 220 | 220 |
|  | Total | 320 | 320 | 320 | 320 | 320 | 320 | 320 | 320 |
| Initial Properties | (1) Appearance | ○ | ○ | ○ | ○ | ○ | ○ | ○ | ○ |
|  | (2) Mar resistance | ⊚ | ○ | ⊚ | ⊚ | ⊚ | ⊚ | X | ⊚ |
|  | (Haze value increased) | 6.7 | 10.8 | 7.9 | 4.8 | 5.7 | 5.7 | 16.1 | 5.2 |
|  | (3) Adhesion properties | ○ | ○ | ○ | ○ | ○ | ○ | ○ | ○ |
|  | (4) Heat resistance | ○ | ○ | ○ | ○ | ○ | X | ○ | ○ |
| (5) Weatherability 2,500 hours | (a) Appearance | ○ | ○ | ○ | ○ | ○ | X | ○ | X |
|  | (b) Transparency | ⊚ | ⊚ | ⊚ | X | ⊚ | X | ⊚ | X |
|  | (Haze value increased) | 2.3 | 2.8 | 3.9 | 11.8 | 3.6 | 15.6 | 1.4 | 17.6 |
|  | (c) Degree of yellowness | ⊚ | ⊚ | ⊚ | X | ⊚ | X | ⊚ | X |

TABLE 2-continued

|  |  | Comparative Examples | | | | | | | |
|---|---|---|---|---|---|---|---|---|---|
|  |  | 1-1 | 1-2 | 1-3 | 1-4 | 1-5 | 1-6 | 1-7 | 1-8 |
|  | (YI value) | 2.1 | 2.3 | 4.9 | 11.2 | 2.6 | 11.5 | 1.9 | 12.3 |
|  | (d) Adhesion properties | ○ | ○ | ○ | ○ | ○ | X | ○ | X |
| 3,500 hours | (a) Appearance | X | X | X | X | X | X | ○ | X |
|  | (b) Transparency | X | X | X | X | X | X | ◎ | X |
|  | (Haze value increased) | 11.8 | 15.4 | 20.5 | 24.6 | 15.3 | 36.8 | 2.1 | 35.4 |
|  | (c) Degree of yellowness | X | X | X | X | X | X | ◎ | X |
|  | (YI value) | 11.8 | 10.7 | 12.3 | 13.6 | 13.1 | 13.9 | 2.9 | 13.2 |
|  | (d) Adhesion properties | ○ | ○ | ○ | ○ | ○ | ○ | ○ | X |

The symbols in Tables 1 and 2 are as follows.

TABLE 3

| Component | Symbol | Summary |
|---|---|---|
| (A) | DPHA | Dipentaerythritol hexaacrylate |
|  | DPCA20 | Dipentaerythritol hexaacrylate modified by 2 caprolactones per molecule (trade name "KAYARAD DPCA20", manufactured by Nippon Kayaku Co., Ltd.) |
| (B) | UA1 | Urethaneacrylate synthesized from 2 moles of dicyclohexylmethane diisocyanate, 1 mole of polycaprolactone diol (weight average molecular weight being 530, trade name "PLACCEL 205", manufactured by Daicel Chemical Industries, Ltd.), and 2 moles of 2-hydroxyethyl acrylate |
|  | UA2 | Urethaneacrylate synthesized from 2 moles of dicyclohexylmethane diisocyanate, 1 mole of polycaprolactone diol (weight average molecular weight being 830, trade name "PLACCEL 208", manufactured by Daicel Chemical Industries, Ltd.), and 2 moles of 2-hydroxyethyl acrylate |
|  | UA3 | Urethaneacrylate synthesized from 2 moles of dicyclohexylmethane diisocyanate, 1 mole of polycaprolactone diol (weight average molecular weight being 1,250, trade name "PLACCEL 212", manufactured by Daicel Chemical Industries, Ltd.), and 2 moles of 2-hydroxyethyl acrylate |
|  | UA4 | Urethaneacrylate synthesized from 2 moles of dicyclohexylmethane diisocyanate, 1 mole of polycaprolactone diol (weight average molecular weight being 2,000, trade name "PLACCEL 220", manufactured by Daicel Chemical Industries, Ltd.), and 2 moles of 2-hydroxyethyl acrylate |
|  | UA6 | Urethaneacrylate synthesized from 1 mole of hexanediol diisocyanate based polyisocyanate ("TPA 100", manufactured by Asahi Kasei Chemicals Corporation) and 3 moles of a compound in which 1 mole of caprolactone is added to a molecule of 2-hydroxyethyl acrylate ("FA-1", manufactured by Daicel Chemical Industries, Ltd.) l = m = n = 1 |
|  | UA7 | Urethaneacrylate synthesized from 1 mole of hexanediol diisocyanate based polyisocyanate ("TPA 100", manufactured by Asahi Kasei Chemicals Corporation) and 3 moles of a compound in which 3 moles of caprolactone is added to a molecule of 2-hydroxyethyl acrylate ("FA-3", manufactured by Daicel Chemical Industries, Ltd.) l = m = n = 3 |
|  | UA8 | Urethaneacrylate synthesized from 1 mole of hexanediol diisocyanate based polyisocyanate ("TPA 100", manufactured by Asahi Kasei Chemicals Corporation) and 3 moles of a compound in which 5 moles of caprolactone is added to a molecule of 2-hydroxyethyl acrylate ("FA-5", manufactured by Daicel Chemical Industries, Ltd.) l = m = n = 5 |
|  | UA9 | Urethaneacrylate synthesized from 1 mole of hexanediol diisocyanate based polyisocyanate ("TPA 100", manufactured by Asahi Kasei Chemicals Corporation) and 3 moles of a compound in which 10 moles of caprolactone is added to a molecule of 2-hydroxyethyl acrylate (FA-10L manufactured by Daicel Chemical Industries, Ltd.) l = m = n = 10 |
|  | UA10 | Urethaneacrylate synthesized from 2 moles of dicyclohexylmethane diisocyanate, 1 mole of nonabutylene glycol (weight average molecular weight being 650) and 2 moles of 2-hydroxyethyl acrylate |
|  | UA11 | Urethaneacrylate synthesized from 2 moles of dicyclohexylmethane diisocyanate, 1 mole of nonabutylene glycol (weight average molecular weight being 850) and 2 moles of 2-hydroxyethyl acrylate |
|  | UA12 | Urethaneacrylate synthesized from 2 moles of dicyclohexylmethane diisocyanate, 1 mole of nonabutylene glycol (weight average |

TABLE 3-continued

| Component | Symbol | Summary |
|---|---|---|
| | | molecular weight being 1,000) and 2 moles of 2-hydroxyethyl acrylate |
| | UA13 | Urethaneacrylate synthesized from 1 mole of hexanediol diisocyanate based polyisocyanate ("TPA 100", manufactured by Asahi Kasei Chemicals Corporation) and 3 moles of 2-hydroxyethyl acrylate |
| | UA14 | Urethaneacrylate synthesized from 1 mole of hexanediol diisocyanate based polyisocyanate ("TPA 100", manufactured by Asahi Kasei Chemicals Corporation) and 3 moles of 4-hydroxybutyl acrylate |
| (C) | TAIC | Tris(2-acryloyloxyethyl)isocyanurate |
| | BAIC | Bis(2-acryloyloxyethyl)hydroxyethylisocyanurate |
| | TAIC-1C | Tris(2-acryloyloxyethyl)isocyanurate modified by one caprolactone per molecule (trade name "ARONIX M-325", manufactured by Toagosei Co., Ltd.) |
| | TAIC-3C | Tris(2-acryloyloxyethyl)isocyanurate modified by three caprolactones per molecule (trade name "ARONIX M-327", manufactured by Toagosei Co., Ltd.) |
| (D) | BNP | Benzophenone |
| | MPG | Methylphenyl glyoxylate |
| (E) | HBPB | 2-(2-hydroxy-5-tert-butylphenyl)benzotriazole |
| | HHBT | A mixture of 2-[4-(2-hydroxy-3-dodecyloxy-propyl)oxy-2-hydroxyphenyl]-4,6-[bis(2,4-dimethylphenyl)-1,3,5-triazine and 2-[4-(2-hydroxy-3-tridecyloxy-propyl)oxy-2-hydroxyphenyl]-4,6-[bis(2,4-dimethylphenyl)-1,3,5-triazine (trade name "Tinuvin 400", manufactured by Ciba Specialty Chemicals Holding Inc.) |
| | OHBT | 2-[4-(octyl-2-methylethanoate)oxy-2-hydroxyphenyl]-4,6-[bis(2,4-dimethylphenyl)]-1,3,5-triazine (trade name "Tinuvin 479", manufactured by Ciba Specialty Chemicals Holding Inc.) |
| (F) | BTPS | Bis(2,2,6,6-tetramethyl-4-piperidyl)sebacate |
| Others | PMG | Propylene glycol monomethyl ether |
| | MIBK | Methyl isobutyl ketone |

Example 2-1

A coating composition was prepared according to the compounding ratio shown in Table 4 and coated on a polycarbonate resin plate of 3 mm in thickness (trade name "LEXAN LS-2", manufactured by General Electric Co.) by spray coating in such a way that the obtained cured film has a thickness of 8 μm. The resultant plate was subjected to heat treatment at 80° C. for 3 minutes in an oven to volatilize organic solvents and an energy of 3,000 mJ/cm² (the value measured with an ultraviolet actinometric meter "UV-351 (SN type)", manufactured by ORC Manufacturing Co., Ltd.) of accumulated light quantity at a wavelength of 340 to 380Nm was irradiated on the resultant plate using a high pressure mercury lamp in air to obtain a cured film. The evaluation results of the obtained cured film are shown in Table 4.

Examples 2-2 to 2-5 and Comparative Examples 2-1 to 2-8

Coating compositions were prepared according to the compounding ratios shown in Tables 4 and 5 and cured films were obtained with the same condition as in Example 2-1. The evaluation results of the obtained cured films are shown in Tables 4 and 5.

Example 2-6

A coating composition was prepared according to the compounding ratio shown in Table 4 and coated on a polymethylmethacrylate resin plate of 3 mm in thickness (trade name "ACRYPET VH", manufactured by Mitsubishi Rayon Co., Ltd.) by spray coating in such a way that the obtained cured film has a thickness of 8 μm. The resultant plate was subjected to heat treatment at 80° C. for 3 minutes in an oven to volatilize organic solvents and an energy of 3,000 mJ/cm² (the value measured with an ultraviolet actinometric meter "UV-351 (SN type)" manufactured by ORC Manufacturing Co., Ltd.) of accumulated light quantity at a wavelength of 340 to 380Nm was irradiated on the resultant plate using a high pressure mercury lamp in air to obtain a cured film. The evaluation results of the obtained cured film are shown in Table 4.

Comparative Example 2-9

A coating composition was prepared according to the compounding ratio shown in Table 5 and a cured film was obtained with the same condition as in Example 2-6. The evaluation results of the obtained cured film are shown in Table 5.

TABLE 4

| | | Examples | | | | | |
|---|---|---|---|---|---|---|---|
| | | 2-1 | 2-2 | 2-3 | 2-4 | 2-5 | 2-6 |
| Coating composition | Component (A) | DPCA20 | DPCA30 | DPCA60 | DPCA120 | DPCA20 | DPCA30 |
| | | 30 | 35 | 32 | 58 | 15 | 30 |

TABLE 4-continued

|  |  | Examples | | | | | |
| --- | --- | --- | --- | --- | --- | --- | --- |
|  |  | 2-1 | 2-2 | 2-3 | 2-4 | 2-5 | 2-6 |
|  | Component (B) | UA 24 | UA 45 | UA 15 | UA 18 | UA 15 | UA 30 |
|  | Component (C) | TAIC 32 | TAIC 7 | BAIC 46.5 | TAIC-3C 15 | TAIC 58.5 | TAIC-1C 30 |
|  | Component (D) | BNP 3 — — | BNP 3 — — | BNP 1 MPG 2 | BNP 3 — — | BNP 1 MPG 2 | BNP 3 — — |
|  | Component (E) | HBPB 10 | HBPB 9.5 | OHBT 3 | HHBT 5 | HHBT 8 | OHBT 5 |
|  | Component (F) | BTPS 1 | BTPS 0.5 | BTPS 0.5 | BTPS 1 | BTPS 0.5 | BTPS 2 |
|  | Subtotal | 100 | 100 | 100 | 100 | 100 | 100 |
|  | Isobutanol | 50 | 50 | 50 | 50 | 50 | 50 |
|  | N-butyl acetate | 60 | 60 | 60 | 60 | 60 | 60 |
|  | PGM | 70 | 70 | 70 | 70 | 70 | 70 |
|  | MIBK | 40 | 40 | 40 | 40 | 40 | 40 |
|  | Subtotal | 220 | 220 | 220 | 220 | 220 | 220 |
|  | Total | 320 | 320 | 320 | 320 | 320 | 320 |
| Initial Properties | (1) Appearance | ○ | ○ | ○ | ○ | ○ | ○ |
|  | (2) Mar resistance | ◎ | ○ | ◎ | ◎ | ○ | ◎ |
|  | (Haze value increased) | 6.5 | 10.4 | 9.2 | 9.8 | 10.8 | 8.5 |
|  | (3) Adhesion properties | ○ | ○ | ○ | ○ | ○ | ○ |
|  | (4) Heat resistance | ○ | ○ | ○ | ○ | ○ | ○ |
| (5) Weatherability 3,000 hours | (a) Appearance | ○ | ○ | ○ | ○ | ○ | ○ |
|  | (b) Transparency | ◎ | ◎ | ◎ | ◎ | ◎ | ◎ |
|  | (Haze value increased) | 1.3 | 1.1 | 2.2 | 3.4 | 1.3 | 1.2 |
|  | (c) Degree of yellowness | ◎ | ◎ | ◎ | ◎ | ◎ | ◎ |
|  | (YI value) | 2.2 | 2.4 | 3.6 | 4.8 | 2.4 | 1.8 |
|  | (d) Adhesion properties | ○ | ○ | ○ | ○ | ○ | ○ |
| 4,000 hours | (a) Appearance | ○ | ○ | ○ | ○ | ○ | ○ |
|  | (b) Transparency | ◎ | ◎ | ◎ | ○ | ◎ | ◎ |
|  | (Haze value increased) | 3.2 | 3.1 | 4.2 | 8.3 | 3.7 | 4.2 |
|  | (c) Degree of yellowness | ◎ | ◎ | ◎ | ◎ | ◎ | ◎ |
|  | (YI value) | 2.7 | 2.9 | 4.2 | 4.7 | 3.4 | 3.2 |
|  | (d) Adhesion properties | ○ | ○ | ○ | ○ | ○ | ○ |

TABLE 5

|  |  | Comparative Examples | | | | | | | | |
| --- | --- | --- | --- | --- | --- | --- | --- | --- | --- | --- |
|  |  | 2-1 | 2-2 | 2-3 | 2-4 | 2-5 | 2-6 | 2-7 | 2-8 | 2-9 |
| Coating composition | Component (A) | DPHA 30 | DPHA 35 | DPHA 32 | DPHA 40 | PETTA 40 | PETIA 40 | DPCA30 75 | DPCA60 5 | DPCA20 40 |
|  | Component (B) | UA 24 | UA 45 | UA 15 | UA 24 | UA 24 | UA 24 | UA 8 | UA 40 | UA 0 |
|  | Component (C) | TAIC 32 | TAIC 7 | BAIC 46.5 | TAIC-3C 26 | TAIC 26 | TAIC 26 | TAIC-1C 8 | TAIC 43.5 | TAIC 51.5 |
|  | Component (D) | BNP 3 — — | BNP 3 — — | BNP 1 MPG 2 | BNP 3 — — | BNP 3 — — | BNP 3 — — | BNP 1 MPG 2 | BNP 3 — — | BNP 1 MPG 2 |
|  | Component (E) | HBPB 10 | HHBT 9.5 | HBPB 3 | HBPB 6 | HBPB 6 | HBPB 6 | HHBT 5 | OHBT 8 | OHBT 3 |
|  | Component (F) | BTPS 1 | BTPS 0.5 | BTPS 0.5 | BTPS 1 | BTPS 1 | BTPS 1 | BTPS 1 | BTPS 0.5 | BTPS 2.5 |
|  | Subtotal | 100 | 100 | 100 | 100 | 100 | 100 | 100 | 100 | 100 |
|  | Isobutanol | 50 | 50 | 50 | 50 | 50 | 50 | 50 | 50 | 50 |
|  | N-butyl acetate | 60 | 60 | 60 | 60 | 60 | 60 | 60 | 60 | 60 |
|  | PGM | 70 | 70 | 70 | 70 | 70 | 70 | 70 | 70 | 70 |
|  | MIBK | 40 | 40 | 40 | 40 | 40 | 40 | 40 | 40 | 40 |
|  | Subtotal | 220 | 220 | 220 | 220 | 220 | 220 | 220 | 220 | 220 |
|  | Total | 320 | 320 | 320 | 320 | 320 | 320 | 320 | 320 | 320 |
| Initial Properties | (1) Appearance | ○ | ○ | ○ | ○ | ○ | ○ | ○ | ○ | ○ |
|  | (2) Mar resistance | ◎ | ◎ | ◎ | ◎ | ◎ | ○ | ○ | X | ○ |
|  | (Haze value increased) | 5.3 | 6.6 | 5.1 | 6.6 | 9.9 | 12.5 | 10.4 | 16.3 | 6.3 |

TABLE 5-continued

|  |  |  |  | Comparative Examples | | | | | | | | |
|---|---|---|---|---|---|---|---|---|---|---|---|---|
|  |  |  |  | 2-1 | 2-2 | 2-3 | 2-4 | 2-5 | 2-6 | 2-7 | 2-8 | 2-9 |
|  | (3) Adhesion properties |  |  | ○ | ○ | ○ | ○ | ○ | ○ | ○ | ○ | ○ |
|  | (4) Heat resistance |  |  | ○ | ○ | ○ | ○ | ○ | ○ | ○ | ○ | ○ |
| (5) Weatherability | 3,000 hours | (a) Appearance |  | ○ | X | X | ○ | X | ○ | X | ○ | X |
|  |  | (b) Transparency |  | ◎ | X | X | ◎ | X | ○ | X | ◎ | X |
|  |  | (Haze value increased) |  | 4.9 | 11.3 | 17.8 | 3.9 | 12.8 | 6.9 | 27.3 | 3.2 | 32.2 |
|  |  | (c) Degree of yellowness |  | ◎ | ○ | ○ | ◎ | ○ | ◎ | ○ | ◎ | ○ |
|  |  | (YI value) |  | 3.3 | 6.2 | 5.8 | 3.1 | 6.8 | 3.9 | 9.7 | 2.3 | 8.9 |
|  |  | (d) Adhesion properties |  | ○ | ○ | ○ | ○ | ○ | ○ | ○ | ○ | ○ |
|  | 4,000 hours | (a) Appearance |  | X | X | X | X | X | X | X | ○ | X |
|  |  | (b) Transparency |  | ○ | X | X | X | X | X | X | ◎ | X |
|  |  | (Haze value increased) |  | 9.2 | 25.8 | 32.2 | 12.0 | 21.7 | 13.6 | 36.0 | 3.2 | 42.5 |
|  |  | (c) Degree of yellowness |  | ○ | X | X | ○ | X | ○ | X | ◎ | X |
|  |  | (YI value) |  | 6.5 | 12.3 | 13.0 | 7.0 | 12.1 | 7.3 | 12.6 | 3.1 | 13.2 |
|  |  | (d) Adhesion properties |  | X | X | X | X | X | ○ | X | ○ | X |

The symbols in Tables 4 and 5 are as follows.

TABLE 6

| Component | Symbol | Summary |
|---|---|---|
| (A) | DPCA20 | Dipentaerythritol hexaacrylate modified by 2 caprolactones per molecule (trade name "KAYARAD DPCA20", manufactured by Nippon Kayaku Co., Ltd.) |
|  | DPCA30 | Dipentaerythritol hexaacrylate modified by 3 caprolactones per molecule (trade name "KAYARAD DPCA30", manufactured by Nippon Kayaku Co., Ltd.) |
|  | DPCA60 | Dipentaerythritol hexaacrylate modified by 6 caprolactones per molecule (trade name "KAYARAD DPCA60", manufactured by Nippon Kayaku Co., Ltd.) |
|  | DPCA120 | Dipentaerythritol hexaacrylate modified by 12 caprolactones per molecule (trade name "KAYARAD DPCA120", manufactured by Nippon Kayaku Co., Ltd.) |
|  | DPHA | Dipentaerythritol hexaacrylate |
|  | PETTA | Pentaerythritol tetraacrylate |
|  | PETIA | Pentaerythritol triacrylate |
| (B) | UA | Urethaneacrylate having the molecular mass of 2,500 synthesized from 2 moles of dicyclohexylmethane diisocyanate, 1 mole of nonabutylene glycol (weight average molecular weight being 650) and 2 moles of 2-hydroxyethyl acrylate |
| (C) | TAIC | Tris(2-acryloyloxyethyl)isocyanurate |
|  | BAIC | Bis(2-acryloyloxyethyl)hydroxyethylisocyanurate |
|  | TAIC-1C | Tris(2-acryloyloxyethyl)isocyanurate modified by one caprolactone per molecule (trade name "ARONIX M-325", manufactured by Toagosei Co., Ltd.) |
|  | TAIC-3C | Tris(2-acryloyloxyethyl)isocyanurate modified by three caprolactones per molecule (trade name "ARONIX M-327", manufactured by Toagosei Co., Ltd.) |
| (D) | BNP | Benzophenone |
|  | MPG | Methylphenyl glyoxylate |
| (E) | HBPB | 2-(2-hydroxy-5-tert-butylphenyl)benzotriazole |
|  | HHBT | A mixture of 2-[4-(2-hydroxy-3-dodecyloxy-propyl)oxy-2-hydroxyphenyl]-4,6-[bis(2,4-dimethylphenyl)-1,3,5-triazine and 2-[4-(2-hydroxy-3-tridecyloxy-propyl)oxy-2-hydroxyphenyl]-4,6-[bis(2,4-dimethylphenyl)-1,3,5-triazine (trade name "Tinuvin 400", manufactured by Ciba Specialty Chemicals Holding Inc.) |
|  | OHBT | 2-[4-(octyl-2-methylethanoate)oxy-2-hydroxyphenyl]-4,6-[bis(2,4-dimethyl-phenyl)]-1,3,5-triazine (trade name "Tinuvin 479", manufactured by Ciba Specialty Chemicals Holding Inc.) |
| (F) | BTPS | Bis(2,2,6,6-tetramethyl-4-piperidyl)sebacate |
| Others | PMG | Propylene glycol monomethyl ether |
|  | MIBK | Methyl isobutyl ketone |

INDUSTRIAL APPLICABILITY

By coating the coating composition of the present invention on plastic base materials such as automotive headlamp lenses, it is possible to protect those lenses from an ultraviolet ray or scratches over a long period of time even under severe environment such as high humidity environment and to maintain excellent appearances. Consequently, an excellent field of view can be secured and safety at the time of night driving can be improved.

What is claimed is:

1. An active energy ray-curable coating composition comprising:

(A) 10 to 70% by mass of a poly(meth)acrylate of a mono- or polypentaerythritol represented by the following formula (1),

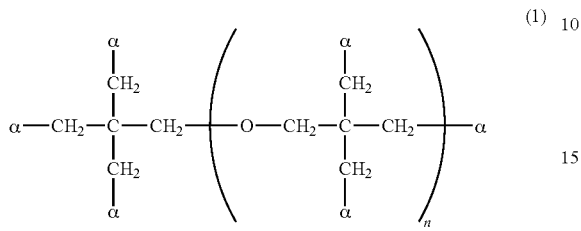

wherein, in formula (1), at least three α's among a plurality of α's respectively represent a (meth)acryloyloxy group ($CH_2$=CR—COO—) or a caprolactone-modified (meth)acryloyloxy group {$CH_2$=CR—CO(O($CH_2$)$_5$C =O)$_y$—O—}, wherein R represents a hydrogen atom or a methyl group and y represents an integer of 1 or more, and the remaining α's respectively represent a hydroxyl group, and n represents an integer of 0 to 4;

(B) 5 to 50% by mass of (B-1) a polyester aliphatic urethanedi(meth)acrylate compound which is obtained by reacting an aliphatic isocyanate compound having two isocyanate groups in a molecule, a caprolactone-modified polyester diol, and an acrylate having a hydroxyl group, (B-2) a urethanepoly(meth)acrylate compound represented by the following formula (2), or (B-3) a polyether urethanedi(meth)acrylate compound having two (meth)acryloyloxy groups in a molecule, wherein, in the case that component (B) is component (B-3), at least one α among a plurality of α's in component (A) is a caprolactone-modified (meth)acryloyloxy group,

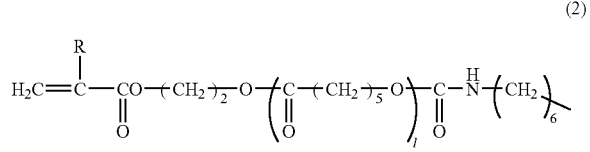

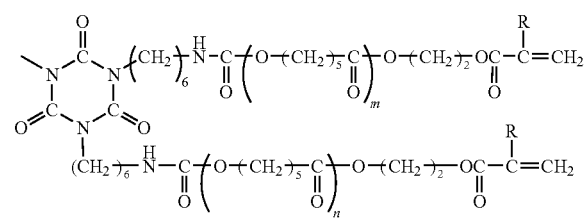

wherein, in formula (2), l, m and n respectively represent an integer of 0 or more and the sum of l, m and n is one or more, and R represents a hydrogen atom or a methyl group;

(C) 5 to 70% by mass of a poly[(meth)acryloyloxyalkyl] (iso)cyanurate represented by the following formula (3) or (4),

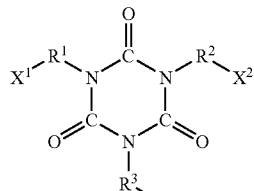

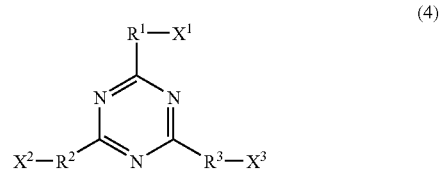

wherein, in formulae (3) and (4), $X^1$, $X^2$ and $X^3$ respectively represent a (meth)acryloyl group ($CH_2$=CR—CO—), a caprolactone-modified (meth)acryloyl group {$CH_2$=CR—CO(O($CH_2$)$_5$C=O)$_z$—}, wherein R represents a hydrogen atom or a methyl group and z represents an integer of 1 or more, a hydrogen atom, or an alkyl group, and at least two of $X^1$, $X^2$ and $X^3$ respectively represent the (meth)acryloyl group or the caprolactone-modified (meth)acryloyl group, and $R^1$, $R^2$ and $R^3$ respectively represent an oxyalkylene group or a polyoxyalkylene group; and (D) 0.1 to 10% by mass of a photopolymerization initiator.

2. The active energy ray-curable coating composition according to claim 1,
wherein component (B) is component (B-1) and a polyester aliphatic urethanedi(meth)acrylate compound which is obtained using a caprolactone-modified polyester diol that has a weight average molecular weight within the range of from 500 to 1,500.

3. The active energy ray-curable coating composition according to claim 1,
wherein component (B) is component (B-2) and the sum of 1, m and n is in the range of from 1 to 15 in the foregoing formula (2).

4. The active energy ray-curable coating composition according to claim 1,
wherein component (B) is component (B-3) and component (A) is a compound in which an average of a sum of modification quantities by caprolactone in a molecule is within the range of from 1 to 6 in the compounds represented by the foregoing formula (1).

5. The active energy ray-curable coating composition according to claim 1, further comprising:
(E) 1 to 30% by mass of an ultraviolet absorbent; and
(F) 0.1 to 5% by mass of a hindered amine light stabilizer, wherein component (B) is component (B-1) or (B-2).

6. The active energy ray-curable coating composition according to claim 5, which gives a haze value increased between before and after a wear test of a molded article according to JIS K7204 using a wear disc CS-10F at a rotation of 100 times under a load of 4.9N being less than 15, a haze value increased between before and after 3,500 hours of exposure in an accelerated weathering test of the molded article using a sunshine weather meter being less than 10, and a yellow index value (degree of yellowness) after the exposure being less than 5, the molded article being a polycarbonate resin plate of 3 mm in thickness on which a cured film of the active energy ray-curable coating composition having a thickness of 8 μm is provided.

7. The active energy ray-curable coating composition according to claim 1 further comprising:

(E) 1 to 30% by mass of an ultraviolet absorbent; and (F) 0.1 to 5% by mass of a hindered amine light stabilizer, wherein component (B) is component (B-3).

8. The active energy ray-curable coating composition according to claim 7, which gives a haze value increased between before and after a wear test of a molded article according to JIS K7204 using a wear disc CS-10F at a rotation of 100 times under a load of 4.9N being less than 15, a haze value increased between before and after 4,000 hours of exposure in an accelerated weathering test of the molded article using a sunshine weather meter being less than 10, and a yellow index value (degree of yellowness) after the exposure being less than 5, the molded article being a polycarbonate resin plate of 3 mm in thickness on which a cured film of the active energy ray-curable coating composition having a thickness of 8 μm is provided.

9. A resin molded article made by coating the active energy ray-curable coating composition of claim 1 on a surface of a synthetic resin molded article and irradiating an active energy ray on the resultant surface to form a cured film on the surface.

10. The resin molded article according to claim 9, wherein the synthetic resin molded article is a polycarbonate resin molded article for automotive headlamp lenses.

* * * * *